Oct. 22, 1968    H. E. FRANKENBERG    3,406,554
APPARATUS FOR AND METHOD OF FORMING CONTAINERS
Filed July 6, 1965    2 Sheets-Sheet 1
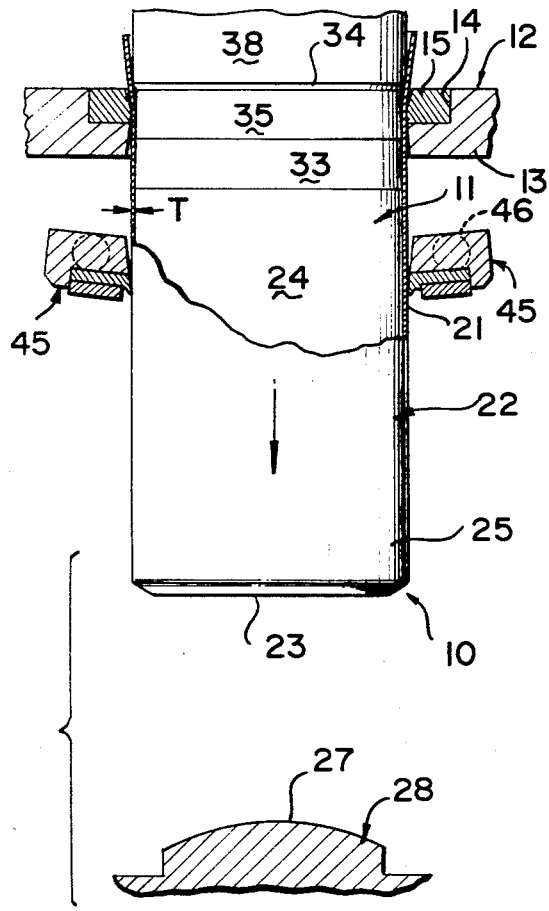
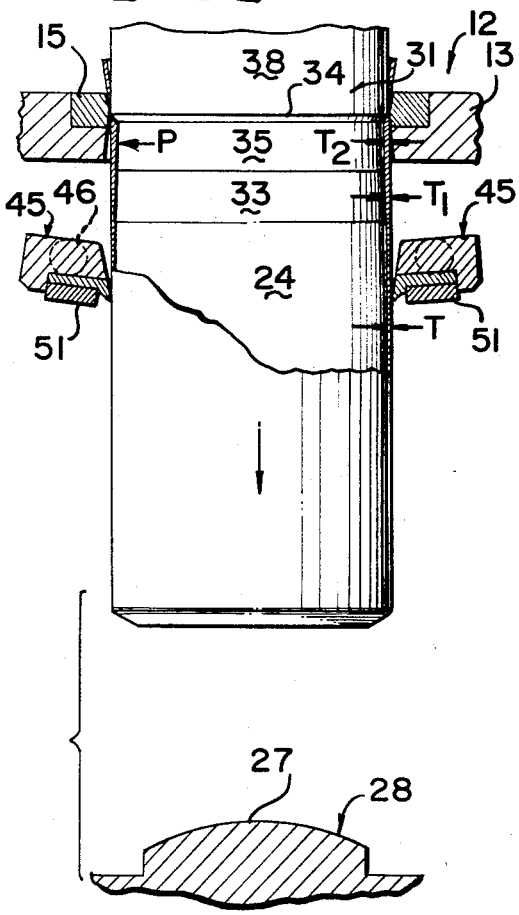
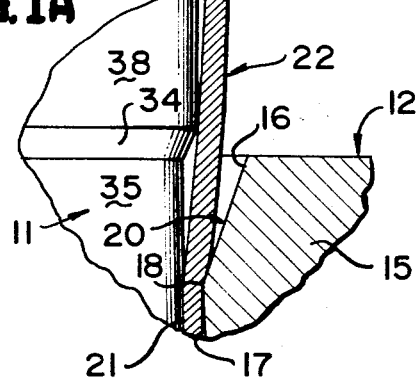
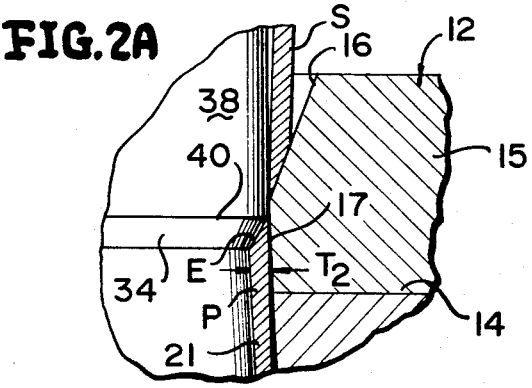
INVENTOR
HENRY E. FRANKENBERG Oct. 22, 1968   H. E. FRANKENBERG   3,406,554
APPARATUS FOR AND METHOD OF FORMING CONTAINERS
Filed July 6, 1965   2 Sheets—Sheet 2
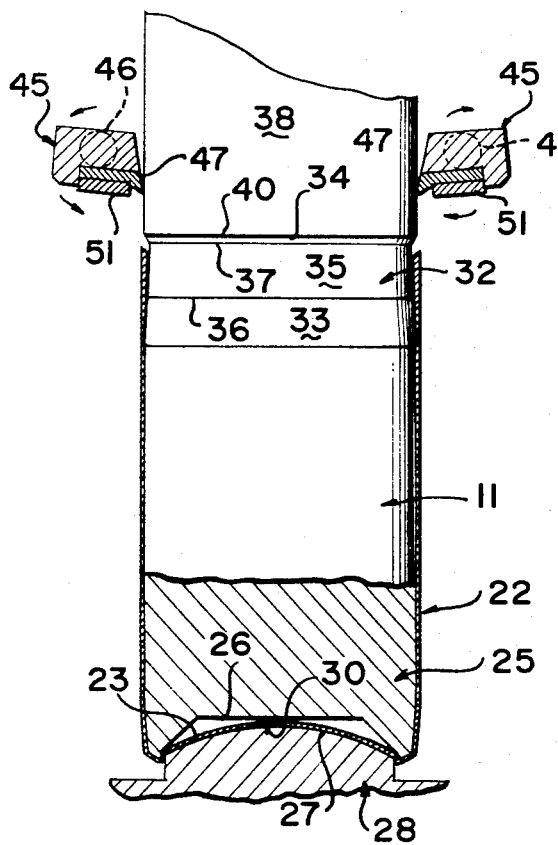
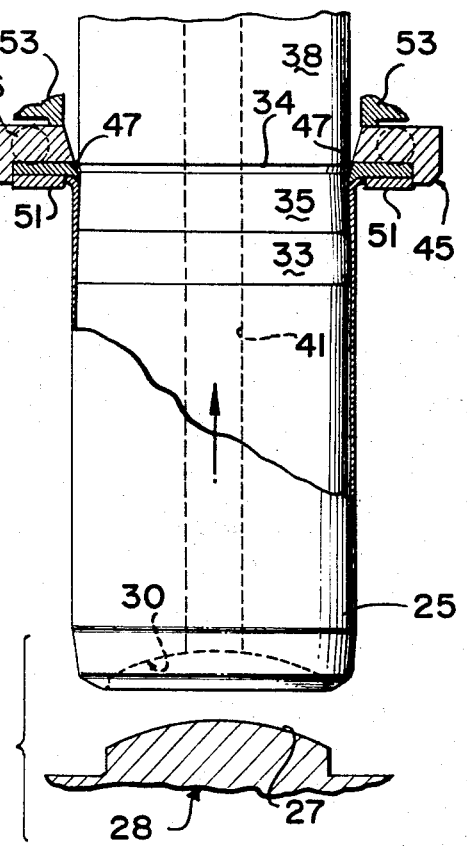
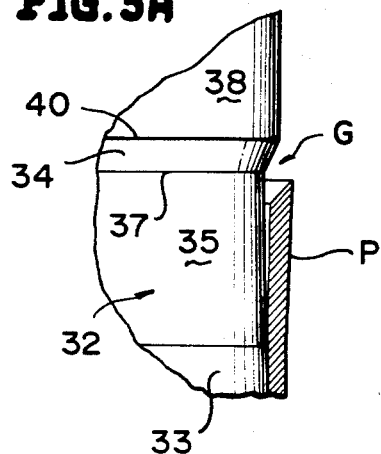
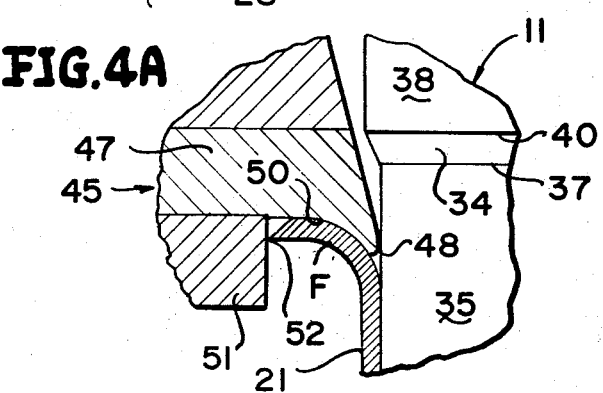
INVENTOR.
HENRY E. FRANKENBERG
BY Mason, Porter, Diller & Brown
ATTORNEYS

United States Patent Office 3,406,554
Patented Oct. 22, 1968

3,406,554
APPARATUS FOR AND METHOD OF FORMING CONTAINERS
Henry E. Frankenberg, Berwyn, Ill., assignor to Continental Can Company, Inc., New York, N.Y., a corporation of New York
Filed July 6, 1965, Ser. No. 469,622
21 Claims. (Cl. 72—333)

ABSTRACT OF THE DISCLOSURE

This invention relates to a novel apparatus for and method of forming containers, and in particular, it is directed to a novel die assembly which includes a male plunger reciprocal relative to a female die between which a cup-shaped article is formed. Means are provided for shifting the article axially relative to the male plunger to form a circumferential gap into which is received a stripping and flanging mechanism. In addition, the plunger is provided with means which deflect a peripheral edge radially outwardly upon the axial movement of the container body relative to the plunger forming a pronounced gap for the reception of the flanging and stripping mechanism.

---

A conventional apparatus for producing cup-like containers, such as cans and other tubular articles having closed ends, includes a punch and die assembly which consists of a male punch or plunger mounted for reciprocal movement to and through one or more die openings of female dies. The die openings are of diminishing diameters which coperate with the punch to progressively thin the body wall of a cup-shaped article externally telescopically surrounding the punch. The punch generally descends through the die openings and at the bottom of its stroke a portion of the article is trimmed by a severing or trimming ring externally surrounding the punch and the article carried thereby. The article is thereafter removed by strippers which contact the severed edge of the article as the punch is retracted whereupon the article is stripped from the punch. The scrap material, generally an annular band of material, is removed and the cycle is continued to form additional similar articles.

Such conventional punch and die assemblies include many disadvantages as, for example, the inability of the strippers to engage the trimmed peripheral edge of the article or, if the trimmed edge is engaged by the strippers, to remove the article from the punch without damaging or otherwise distorting the peripheral edge and the portion of the body wall of the article adjacent thereto. This is particularly important from the standpoint of manufacturing can bodies wherein subsequent can fabricating operations, such as flanging and end seaming, generally require consistently uniform body wall structures which are undamaged and within predetermined tolerances.

A further disadvantage of conventional punch and die assemblies is the inability to flange articles in a single operating cycle. As was heretofore noted, trimmed articles are stripped from the punch of known punch and die assemblies and thereafter flanged during another operation by conventional flanging mechanisms.

This invention is particularly directed to the manufacture of cans or can bodies and, in accordance therewith, also overcomes a further disadvantage of conventional punch and die assemblies and the inability thereof to provide a particular configuration to a bottom wall of articles. For example, aerosol-type cans generally include recessed bottom walls for reinforcement purposes while numerous other cans have recessed bottom or end walls for esthetic and other reasons. However, while it is highly desirable to bottom-form cans in a single operation no known conventional punch and die assemblies accomplish this highly desirable objective.

It is, therefore, a primary object of this invention to provide a novel apparatus which eliminates each of the foregoing disadvantages of conventional apparatus by means of a novel punch and die structure which trims, bottom-forms and flanges tubular articles having closed bottoms in a single operating cycle.

A further object of this invention is to provide a novel apparatus for forming a tubular article having a body wall terminating at a bottom wall at one end of the article and at a free peripheral edge portion remote from the bottom wall, the apparatus including a male plunger in axial aligned relationship to an opening of a female die, means for reciprocating the plunger relative to the die, the plunger including a main body portion of a predetermined diameter slightly less than the diameter of the die whereby the body wall of an article surrounding the plunger is sized during the passage thereof through the female die upon the movement of the plunger in a first direction, the plunger body having a terminal end portion, means axially opposing the terminal end portion and cooperative therewith for moving the body wall relative to the plunger as the plunger moves in the first direction to form a circumferential gap between a portion of the plunger and the free peripheral edge portion of the article, and means positionable within the circumferential gap for axially opposing the free peripheral edge portion of the body wall to form the peripheral edge portion into a radially outwardly directed flange during the movement of the plunger in a second direction opposite to the first direction.

A further object of this invention is to provide a novel apparatus of the type immediately above-described including means for limting the radial dimension of the flange.

A further object of this invention is to provide a novel method of flanging an article including the steps of arranging an article having a bottom wall and a body wall terminating in a free peripheral edge portion in external telescopic relationship to a male die as the male die is moved in a first direction, applying a force against the bottom wall in a second direction opposite to the first direction whereby the free peripheral edge portion of the body wall is spaced from a portion of the male die and defines a gap therewith, inserting a member having a curved surface opening toward the second direction into the gap, and moving the plunger in a third direction opposite to the first direction causing the peripheral edge portion to be contactingly guided radially outwardly relative to the male die axis thereby providing the article with a radially outwardly directed flange.

Still another object of this invention is to provide a novel method of forming a flanged article having a recessed bottom wall including the steps of arranging an article having a bottom wall and a body wall terminating in a free peripheral edge portion in external telescopic relationship to a male die as the male die is moved in a first direction, urging a portion of the bottom wall in a second direction opposite to the first direction to simultaneously recess the bottom wall and space the free peripheral edge portion from a portion of the male die to define a gap therewith, inserting a member having a curved surface opening toward the second direction into the gap, and moving the plunger in a third direction opposite to the first direction causing the peripheral edge portion to be contactingly guided radially outwardly relative to the male die axis thereby providing the article with a radially outwardly directed flange.

With the above, and other objects in view that will hereinafter appear, the nature of the invention will be more clearly understood by reference to the following detailed description, the appended claims and the several views illustrated in the accompanying drawings:

In the drawings:

FIGURE 1 is an exploded fragmentary side elevational view partially in section of a novel apparatus of this invention, and illustrates a punch drawing an article through a female downwardly toward a bottom forming member.

FIGURE 1A is an enlarged fragmentary side elevational view with parts shown in section, and illustrates a body wall of the article being ironed between a portion of the punch and the female ironing ring.

FIGURE 2 is an exploded fragmentary side elevational view with parts shown in section, and illustrates a trimming operation performed during the continued descent of the punch from the position illustrated in FIGURE 1.

FIGURE 2A is an enlarged fragmentary side elevational view with parts shown in section, and illustrates a trimmed free edge of the article in intimate opposed relationship to a shoulder of the punch at the completion of the trimming operation.

FIGURE 3 is a fragmentary side elevational view partly in section of the apparatus of FIGURES 1 and 2, and illustrates the simultaneously recessing of a bottom wall of the article and the spacing of the trimmed free edge of the body wall from the punch shoulder.

FIGURE 3A is an enlarged fragmentary side elevational view of a portion of the punch in the area of the shoulder with the adjacent body portion shown in cross-section, and more clearly illustrates the circumferential gap between the trimmed peripheral edge of the body and the punch shoulder as well as a slight radial outward flaring of an upper end portion of the body wall.

FIGURE 4 is an exploded fragmentary side elevational view partially in section of the apparatus of FIGURES 1 through 3 and illustrates the formation of a flange by a plurality of flange-forming members as the punch is upwardly retracted.

FIGURE 4A is an enlarged fragmentary view partially in side elevation and partially in section of one of the flange-forming members and the punch, and illustrates a curved surface of the flange-forming member which directs the body wall radially outwardly to form a flange of a predetermined radial dimension.

A novel apparatus constructed in accordance with this invention is a punch and die assembly which is generally referred to by the reference numeral 10. The apparatus or punch and die assembly 10 comprises a male punch or plunger 11 and a female die 12.

The female die 12 includes an ironing ring 13 having an annular groove 14 opening toward the punch 11. An annular ironing member 15 is seated in the groove 14 and is suitably secured to the ironing ring 13. The ironing member 15 is constructed from hardened metallic material, and includes a surface 16 (FIGURE 1A) converging radially inwardly and downwardly toward the plunger axis and a surface 17 converging radially inwardly and upwardly toward the plunger axis. The surfaces 16, 17 merge at a circumferential juncture 18 (FIGURE 1A) which defines the minimum predetermined diameter of an opening 20 of the ironing ring 13. The ironing ring 13 cooperates with the plunger 11 to iron or size a body wall 21 of a tubular article 22, such as a can or similar cup-like article, closed at one end by a generally planar flat bottom wall or panel 23.

The ironing ring 13 is one and the last of a plurality of similar rings (not shown) of the female die 12 which surrounds the male plunger 11. There are generally two additional female rings positioned above the ironing ring 13, as viewed in FIGURES 1 and 2 of the drawings, and each of these rings have openings which are of progressively reduced diameters between the upper ring to the ironing ring 13. As the article 22 is drawn downwardly through the rings of the female die 12 the body wall 21 is progressively reduced in thickness and increased in length.

The male punch or plunger 11 comprises a punch body (unnumbered) having a central body portion 24 of a predetermined diameter. The punch 11 terminates at a terminal end portion 25 (FIGURE 3) having a generally frusto-conical recess 26. The recess 26 opens toward and is cooperative with a convex surface 27 of an upwardly projecting bottom-forming member 28 to form a concavity 30 in the bottom wall 23 of the article 22, as will appear more fully hereinafter.

A second portion 31 of the plunger 11 remote from the terminal end portion 25 and adjacent to the central portion 24 is provided with a relatively shallow circumferential groove 32. The groove 32 is defined by a first frusto-conical surface 33, a second frusto-conical surface 34, and a third frusto-conical surface 35 between the surfaces 33 and 34. The first frusto-conical surface 33 converges radially inwardly and upwardly toward the axis of the plunger 11, and merges with the third frusto-conical surface 35 at a circumferential juncture 36. The third frusto-conical surface 35 similarly converges radially inwardly and upwardly toward the axis of the plunger 11 and merges with the second frusto-conical surface 34 at a circumferential juncture 37. The portion 31 of the plunger 11 terminates in a generally cylindrical uppermost portion 38 merging with the second frusto-conical surface 34 at a circumferential juncture 40. The included angle between a plane taken through the surface 34 and the axis of the plunger 11 is preferably 30°. The surface 34 is the most abruptly converging surface of the surfaces 33–35. The second most convergent surface is the surface 33 followed by the least convergent surface 35 which, under certain circumstances, need not be frusto-conical but can be of a right-cylindrical configuration.

An axial bore or passage 41 (FIGURE 4) is provided in the plunger 11. The passage 41 is connected at its upper end (not shown) by a flexible conduit (also not shown) to a suitable source of compressed air or gas (not shown) to remove the article 22 from the plunger 11 in a manner to be described more fully hereinafter.

A plurality of generally identical flange-forming members 45 surround the plunger 11 beneath the ironing ring 13 of the female die 12. Each of the flange-forming members 45 is supported for pivoting movement by means of a shaft 46. Spring means (not shown) continually bias each of the flange-forming members 45 in the direction of the unnumbered headed arrows in FIGURE 3 to urge a nose 47 of each member 45 toward the axis of the plunger 11. As is best illustrated in FIGURE 4A of the drawings, each nose 47 has a convexly rounded end surface 48 and a flange-forming surface 50 opening generally concavely toward the bottom-forming member 28.

Each of the flange-forming members 45 also includes abutment means 51 in the form of a block secured to the nose 47 in a conventional manner. Each abutment block 51 includes an abutment surface 52 spaced a predetermined radial distance from the exterior of the plunger 11. Pivoting movement of each of the flange-forming members 45 in a direction opposite to the direction indicated by the headed arrows of FIGURE 3 is provided by a stop member 53 (FIGURE 4) immovably fixed in the position shown in FIGURE 4 of the drawings.

At the beginning of a cycle of the punch and die assembly 10 the punch or plunger 11 is positioned above the ironing ring 13, each of the rings (not shown) above the ironing ring 13 and generally completely outwardly of and above the entire female die 12. A metallic blank or a shallow cup-shaped element is supported by conventional means (not shown) between the uppermost of the die rings and the terminal portion 25 of the plunger 11. In the case of a cup-like element, the axis thereof and the axis of the plunger 11 are in alignment.

The plunger 11 is moved downwardly toward the position illustrated in FIGURE 1 of the drawing during which the article 22 is progressively drawn downwardly by the plunger 11 through each of the female rings of the female die 12. The thickness of the body wall 21 is progressively reduced as the article 22 passes through the successive female dies. The actual "drawing" of the article 22 is substantially completed prior to the passage thereof through the ironing ring 13. That is, as opposed to the "drawing" of the article 22 in which the body wall 21 is substantially reduced in wall thickness and increased in length, the ironing operation effects little change in the length of the article 22 and "sizes" the body wall 21 to a predetermined generally uniform thickness. The ironing or sizing takes place at the juncture 18 (FIGURE 1A) as the plunger 11 draws the article 22 through the ironing ring 13.

Between the entry of the terminal portion 25 into the ironing ring 13 and a point at which the frusto-conical surface 33 approaches the juncture 18 the wall thickness of the body wall 21 is substantially uniform. This generally uniform thickness is indicated by the reference character T in FIGURES 1 and 2 of the drawings.

As the frusto-conical surface 33 passes the juncture 18 of the ironing ring 13 the wall thickness of the body wall 21 progressively increases in thickness toward the juncture 36 of the plunger 24. The progressive thickening of the body wall 21 in the area of the surface 33 is indicated by the reference character T1 in FIGURE 2 of the drawings. During the passage of the frusto-conical surface 35 beyond the circumferential juncture 18 of the ironing ring 13 a further progressive thickening of the body wall 21 occurs, and is indicated by the reference character T2 in FIGURES 2 and 2A of the drawings.

An upper edge portion P (FIGURES 2 and 2A) of the article 22 is severed or trimmed as the juncture 40 of the punch 11 passes the juncture 18 of the ironing ring 13, as is clearly illustrated in FIGURE 2A of the drawings. The peripheral edge portion P of the article 22 is thereby provided with a trimmed free peripheral edge E (FIGURE 2A) in intimate opposing relationship to the frusto-conical surface or shoulder 34. An annular piece of scrap material S remains adjacent the ironing ring 13 and is discarded upon the subsequent retraction of the plunger 11 in a conventional manner.

During the downward movement of the plunger 11 and the article 22 the nose 47 of each of the flange-forming members 45 is in contact with the exterior surface (unnumbered) of the article 22 due to the biasing forces tending to rotate the members 45 in the direction of the headed arrows in FIGURE 3.

After the article 22 is trimmed the plunger 11 continues its downward movement from the position illustrated in FIGURE 2 to the position illustrated in FIGURE 3. During this movement the bottom wall 23 initially contacts the convex surface 27 of the bottom forming member 28. After this initial contact the continued downward movement of the plunger 11 relative to the fixed member 28 forms the concave recess 30. As the bottom wall 23 is recessed from the generally planar position of FIGURES 1 and 2 to the concave configuration of FIGURE 3 the body wall 21 is drawn downwardly whereupon the free edge E is spaced from the surface 34 of the plunger 11 to define therewith a generally cylindrical gap G (FIGURE 3A). During this relative movement between the body wall 21 and the plunger 24 the peripheral end portion P of the body wall 21 is flared radially outwardly, as is also best illustrated in FIGURE 3A of the drawings. This outward flaring of the portion P is caused by the downward movement of the article 22 relative to the plunger 11 because of the different convergent angles of the surfaces 33, 35. That is, the less convergent surface 33 urges the greater convergent internal surface of the peripheral edge portion P radially outwardly as these surfaces move relative to each other during the downward movement of the body wall 21 relative to the plunger 11. The convergent surface formed by the frusto-conical portion 33 is similarly urged outwardly as the same is drawn downwardly beyond the surface 33 during the bottom-forming operation graphically illustrated in FIGURES 3 and 3A of the drawings.

After the recess 30 has been formed, the means (not shown) for reciprocating the plunger 11 being retracting the latter upwardly from the position illustrated in FIGURE 3 of the drawings. As the plunger 11 moves upwardly from the position shown in FIGURE 3 toward the position shown in FIGURE 4, the blunt end surface 48 of the nose 47 of each of the flange-forming members 45 enters the gap G under the biasing influence of the spring means (not shown) continually urging the flange-forming members in the manner heretofore noted and illustrated by the headed unnumbered arrows in FIGURE 3 of the drawings. The continued upward movement of the plunger 11 causes the free peripheral edge E of the body wall 21 to contact and be guided by each of the flange-forming surfaces 50 in a radially outward direction to form a flange F, as is clearly illustrated in FIGURE 4A of the drawings. During the formation of the flange F the article 22 is retained on the plunger 11 by the frictional forces between the plunger portions 24, 33 and the interior of the body wall 21. Upon the contact of the peripheral edge E of the flange F with the abutment surface 52 (FIGURE 4A) the formation of the flange F is completed and continued upward movement of the plunger 11 strips or removes the article 22 from the plunger 11. This stripping operation may be augmented by or performed entirely by introducing compressed air through the conduit 41. During the entire portion of the upward movement of the plunger 11 from the time the flange-forming members contact the edge E of the article 22 until the article 22 is removed the stop means 53 limit the pivoting of the flange-forming members 45 in the manner clearly illustrated in FIGURE 4 of the drawings.

After the flanged article 22 has been stripped from the plunger 11 the latter is removed from the area between the flange-forming members 45 and the bottom-forming member 28 during the continued upward movement of the plunger 11. The annular scrap S of material is removed by conventional strippers as the plunger 11 continues toward its position at the beginning of the cycle outwardly of the female die 12. At this point another blank or shallow cup-like article may be positioned in the manner heretofore noted and the cycle repeated to produce similar ironed, trimmed, flanged and bottomed articles in a single operating cycle of the apparatus 10.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. Apparatus for forming tubular articles comprising a female ring die and a male plunger in axial relationship, means for reciprocating said plunger relative to said die whereby the body wall of an article surrounding said plunger is sized during the passage thereof through the female die ring, said plunger including a body of a predetermined diameter, said plunger body having a terminal end portion and a portion remote from said terminal end portion, said remote portion being of a diameter less than the diameter of said plunger body, means axially opposing said terminal end portion and cooperative therewith to move an article axially relative to said plunger thereby forming a gap between a free edge of the article and said plunger, and means for entering the gap and contacting the free edge of the article whereby the latter is removed from the plunger upon relative movement between said plunger and said last-mentioned means.

2. Apparatus for forming a tubular article having a body wall terminating at a bottom wall at one end of the article and at a free peripheral edge portion remote from the bottom wall comprising a female ring die, a male plunger in axially aligned relationship with said female ring die, means for reciprocating said plunger relative to said die, said plunger including a main body portion of a predetermined diameter slightly less than the diameter of said die whereby the body wall of an article surrounding the plunger is sized during the passsage thereof through the die upon the movement of the plunger in a first direction, said plunger body having a terminal end portion, means axially opposing said terminal end portion and cooperative therewith for moving the body wall relative to the plunger as the plunger moves in said first direction, and means for removing the article from the plunger.

3. Apparatus for forming a tubular article having a body wall terminating at a bottom wall at one end of the article and at a free peripheral edge portion remote from the bottom wall comprising a femal ring die, a male plunger in axially aligned relationship with said female ring die, means for reciprocating said plunger relative to said die, said plunger including a main body of a predetermined diameter slightly less than the diameter of said die whereby the body wall of an article surrounding the plunger is sized during the passage thereof through the die upon the movement of the plunger in a first direction, said plunger body having a terminal end portion, means axially opposing said terminal end portion and cooperative therewith for simultaneously forming the bottom wall to a concave configuration opening toward said first direction and moving the body wall relative to the plunger in said first direction as the plunger moves in said first direction, and means for removing the article from the plunger.

4. Apparatus for forming a tubular article having a body wall terminating at a bottom wall at one end of the article and at a free peripheral edge portion remote from the bottom wall comprising a female ring die, a male plunger in axially aligned relationship with said female ring die, means for reciprocating said plunger relative to said die, said plunger including a main body portion of a predetermined diameter slightly less than the diameter of said die whereby the body wall of an article surrounding the plunger is sized during the passage thereof through the die upon the movement of the plunger in a first direction, said plunger body having a terminal end portion, means axially opposing said terminal end portion and cooperative therewith for moving the body wall relative to the plunger as the plunger moves in said first direction, means for removing the article from the plunger, and means for forming the free peripheral edge portion of the body wall into a radially outwardly directed flange during the movement of said plunger in a second direction opposite to said first direction.

5. Apparatus for forming a tubular article having a body wall terminating at a bottom wall at one end of the article and at a free peripheral edge portion remote from the bottom wall comprising a female ring die, a male plunger in axially aligned relationship with said female ring die, means for reciprocating said plunger relative to said die, said plunger including a main body of a predetermined diameter slightly less than the diameter of said die whereby the body wall of an article surrounding the plunger is sized during the passage thereof through the die upon the movement of the plunger in a first direction, said plunger body having a terminal end portion, means axially opposing said terminal end portion and cooperative therewith for simultaneously forming the bottom wall to a concave configuration opening toward said first direction and moving the body wall relative to the plunger in said first direction as the plunger moves in said first direction, means for removing the article from the plunger, and means for forming the free peripheral edge portion of the body wall into a radially outwardly directed flange during the movement of said plunger in a second direction opposite to said first direction.

6. Apparatus for forming a tubular article having a body wall terminating at a bottom wall at one end of the article and at a free peripheral edge portion remote from the bottom wall comprising a female ring die, a male plunger in axially aligned relationship with said female ring die, means for reciprocating said plunger relative to said die in first and second opposite directions, said plunger including a main body portion of a predetermined diameter slightly less than the diameter of said die whereby the body wall of an article surrounding the plunger is sized to a predetermined wall thickness during the passage thereof through the die upon the movement of the plunger in said first direction, said plunger body having a terminal end portion and another portion remote from said terminal end portion, said another portion being of a diameter less than the predetermined diameter of the main body portion whereby the free peripheral edge portion of the body wall is of a thickness greater than the predetermined wall thickness, means for circumferentially severing the peripheral edge portion to form a free peripheral edge, means for moving said article relative to said plunger in said first direction during the movement of said plunger in said first direction whereby the free peripheral edge is shifted radially outwardly and axially downwardly relative to the plunger axis, and means for removing the article by contacting the free peripheral edge thereof as the plunger is moved in said second direction.

7. The apparatus as defined in claim 6 wherein said terminal end portion includes an end face, said means for moving said article relative to said plunger being in axially opposed relationship to said end face, and said end face being recessed for at least partially receiving said last mentioned means during the movement of said plunger in said first direction.

8. The apparatus as defined in claim 6 including means for contacting the free peripheral edge of the body wall as the plunger is moved in said second direction, and said contacting means including surface means contoured for forming the peripheral edge portion of the body wall into a radially outwardly directed flange.

9. The apparatus as defined in claim 7 including means for contacting the free peripheral edge of the body wall as the plunger is moved in said second direction, and said contacting means including surface means contoured for forming the peripheral edge portion of the body wall into a radially outwardly directed flange.

10. Apparatus for forming a tubular article having a body wall terminating at a bottom wall at one end of the article and at a free peripheral edge portion remote from the bottom wall comprising a female ring die, a male plunger in axially aligned relationship with said female ring die, means for reciprocating said plunger relative to said die in first and second opposite directions, said plunger including a main body portion of a predetermined diameter slightly less than the diameter of said die whereby the body wall of an article surrounding the plunger is sized to a predetermined wall thickness during the passage thereof through the die upon the movement of the plunger in said first direction, said plunger body having a terminal end portion, said plunger body further including a circumferential shoulder remote from and facing toward said terminal end portion, means for severing the free peripheral edge portion of the body wall adjacent said shoulder to provide the body wall with a free peripheral edge in axially opposed relationship to said shoulder, means for axially shifting the article relative to the plunger whereby the free peripheral edge is moved into axially spaced relationship to said shoulder to define a circumferential space, and means movable into the space whereby the peripheral edge is contacted upon the movement of the plunger in said second direction.

11. The apparatus as defined in claim 10 wherein said movable means includes a concavely curved surface opening in the same direction as said shoulder whereby said body wall is provided with a radially outwardly directed flange upon the movement of said plunger in said second direction.

12. The apparatus as defined in claim 11 including means for abutting the free peripheral edge of the body wall thereby limiting the radial outward extent of the body wall flange.

13. A method of removing an article from a male die of a die assembly comprising the steps of arranging an article having a bottom wall and a body wall terminating in a free peripheral edge portion in external telescopic relationship to a male die as the male die is moved in a first direction, applying a force against the bottom wall in a second direction opposite to the first direction whereby the free peripheral edge portion is spaced from a portion of the male die and defines a gap therewith, inserting a member in the gap between the peripheral edge portion of the body and the male die portion, and moving the plunger in a third direction opposite to the first direction whereby the peripheral edge portion contacts the member thereby removing the article from the plunger upon continued movement of the plunger in said third direction.

14. A method of flanging an article comprising the steps of arranging an article having a bottom wall and a body wall terminating in a free peripheral edge portion in external telescopic relationship to a male die as the male die is moved in a first direction, applying a force against the bottom wall in a second direction opposite to the first direction whereby the free peripheral edge portion is spaced from a portion of the male die and defines a gap therewith, inserting a member having a curved surface opening toward said second direction into said gap, and moving the plunger in a second direction opposite to the first direction causing the peripheral edge portion to be contactingly guided radially outwardly relative to the male die axis thereby providing the article with a radially outwardly directed flange.

15. A method of forming a flanged article having a recessed bottom wall comprising the steps of arranging an article having a bottom wall and a body wall terminating in a free peripheral edge portion in external telescopic relationship to a male die as the male die is moved in a first direction, urging a portion of the bottom wall in a second direction opposite to said first direction thereby simultaneously providing the bottom wall with a recess and spacing the free peripheral edge portion from a portion of the male die to define a gap, inserting a member having a curved surface opening toward said second direction into said gap, and moving the plunger in a direction opposite to the first direction causing the peripheral edge portion to be contactingly guided radially outwardly relative to the male die axis thereby providing the article with a radially outwardly directed flange.

16. A male plunger adapted for forming drawn cup-like articles comprising a plunger body, said plunger body having a central portion of a predetermined diameter, first and second portions to either side of said central portion, said first portion being a terminal portion having an end surface, said second portion including a circumferential groove defined by at least first and second frusto-conical surfaces, said first surface converging toward the plunger axis in a direction away from said terminal portion, said second surface converging toward the plunger axis in a direction toward said terminal portion, and the second surface converging more abruptly toward the plunger axis than the first surface.

17. The male plunger die as defined in claim 16 wherein said circumferential groove is further defined by a third frusto-conical surface between said first and second surfaces, and said third surface converges in the same direction as but more abruptly than the first surface.

18. The apparatus as defined in claim 10 including means for radially outwardly deflecting the free peripheral edge portion of the body wall during the axial shifting of the article relative to the plunger.

19. A male plunger adapted for forming drawn cup-like articles comprising a plunger body, said plunger body having a central portion of a predetermined diameter, a terminal end portion, and a portion remote from said terminal end portion, and said remote portion including means for deflecting a free peripheral edge portion of a cup-like body in a radially outward direction upon relative sliding movement between the plunger body and a peripheral wall of an article carried thereby, wherein said last-mentioned means is a circumferential groove which is defined at least in part by a generally frusto-conical surface converging toward the plunger axis in a direction away from said terminal portion.

20. The apparatus as defined in claim 1 including means for radially outwardly deflecting the free edge of an article on said plunger upon the relative axial movement between said article and said plunger.

21. The apparatus as defined in claim 6 including means for radially outwardly deflecting the free edge of an article on said plunger upon the relative axial movement between said article and said plunger.

References Cited

UNITED STATES PATENTS

| | | | |
|---|---|---|---|
| 2,369,260 | 2/1945 | Slater | 72—344 |
| 3,039,413 | 6/1962 | Rogers | 72—348 X |
| 3,130,698 | 4/1964 | Knowles | 113—7 |
| 3,167,044 | 1/1965 | Henrickson | 113—46 |
| 3,232,260 | 2/1966 | Siemonsen | 113—7 X |
| 3,270,544 | 9/1966 | Maeder et al. | 113—120 |

CHARLES W. LANHAM, *Primary Examiner.*